(12) United States Patent
Albrecht et al.

(10) Patent No.: US 12,391,031 B2
(45) Date of Patent: Aug. 19, 2025

(54) SPACER DEVICE FOR A SYSTEM FOR LAMINATING

(71) Applicant: HANWHA Q CELLS GMBH, Bitterfeld-Wolfen (DE)

(72) Inventors: Uwe Albrecht, Bitterfeld-Wolfen (DE); Stephanie Pfennig, Bitterfeld-Wolfen (DE); Christoph Lenz, Bitterfeld-Wolfen (DE)

(73) Assignee: HANWHA Q CELLS GMBH, Bitterfeld-Wolfen (DE)

( * ) Notice: Subject to any disclaimer, the term of this patent is extended or adjusted under 35 U.S.C. 154(b) by 283 days.

(21) Appl. No.: 18/006,801

(22) PCT Filed: Jul. 26, 2021

(86) PCT No.: PCT/EP2021/070824
§ 371 (c)(1),
(2) Date: Jan. 25, 2023

(87) PCT Pub. No.: WO2022/023248
PCT Pub. Date: Feb. 3, 2022

(65) Prior Publication Data
US 2023/0264462 A1     Aug. 24, 2023

(30) Foreign Application Priority Data
Jul. 28, 2020   (DE) .......................... 102020119857.4

(51) Int. Cl.
*B32B 37/10*     (2006.01)
*B30B 5/02*      (2006.01)
(Continued)

(52) U.S. Cl.
CPC ............ *B32B 37/1027* (2013.01); *B30B 5/02* (2013.01); *B30B 5/04* (2013.01); *B32B 37/003* (2013.01);
(Continued)

(58) Field of Classification Search
CPC . B32B 37/0007; B32B 37/1027; B32B 37/26; B32B 37/003; B30B 5/02; B30B 5/04
(Continued)

(56) References Cited

U.S. PATENT DOCUMENTS 10,317,897 B1    6/2019  Kentley-Kay et al.
2015/0061895 A1  3/2015  Ricci
(Continued)

FOREIGN PATENT DOCUMENTS

EP         2 871 866 A1    5/2015
WO    WO-2014046810 A1 *  3/2014   ............ B30B 15/34

*Primary Examiner* — James D Sells
(74) *Attorney, Agent, or Firm* — Christensen, Fonder, Dardi & Herbert PLLC

(57) ABSTRACT

A spacing device for a system for laminating a laminate, in particular photovoltaic modules. The system includes a membrane holder adapted to apply a membrane to the laminate under pressure for lamination. The spacing device includes a circulating belt and a plurality of spacing members connected to the band and configured to at least partially form a frame for the laminate in at least a portion of the circulating belt and thereby suppress edge compression of the laminate during lamination.

11 Claims, 4 Drawing Sheets

(51) Int. Cl.
    *B30B 5/04* (2006.01)
    *B32B 37/00* (2006.01)
    *B32B 37/26* (2006.01)

(52) U.S. Cl.
    CPC ........ *B32B 37/26* (2013.01); *B32B 2037/262* (2013.01); *B32B 2037/268* (2013.01); *B32B 2457/12* (2013.01)

(58) Field of Classification Search
    USPC ....................................................... 156/381
    See application file for complete search history.

(56) References Cited

U.S. PATENT DOCUMENTS

| | | |
|---|---|---|
| 2017/0153636 A1 | 6/2017 | Boesen |
| 2018/0208204 A1 | 7/2018 | Chen |

\* cited by examiner

SPACER DEVICE FOR A SYSTEM FOR LAMINATING

PRIORITY CLAIM

The present application is a National Phase entry of PCT Application No. PCT/EP2021/070824, filed Jul. 26, 2021, which claims priority from German Patent Application No. 10 2020 119 857.4, filed Jul. 28, 2020, the disclosures of which are hereby incorporated by reference herein in their entirety.

FIELD OF THE INVENTION

The present invention relates to a spacing device for a system for laminating a laminate, in particular photovoltaic modules, with a membrane, and to a method for manufacturing such a spacing device.

BACKGROUND

Production of photovoltaic modules includes lamination of layers of a laminate (stack of layers) under pressure and elevated temperature. For this lamination, the use of so-called membrane laminators is widespread. The laminating process can be largely automated by a system that transports, in particular, a large number of such laminates into a lamination chamber in which a clamped membrane in a clamping frame is pressed from above onto the laminate to be laminated. At the same time, heat is supplied to the laminate and the pressure around the laminate is reduced by a suction device, which can increase or effect the pressure of the membrane.

Under the pressure of the membrane, the surface of which extends beyond that of the laminate, overpressing can occur in edge areas of the laminate. This can lead to edge pinching, i.e. a reduction in thickness in the edge area of the laminate. This can result in tensile forces within the laminate, which can cause delamination or, for example, breakage of a cover glass layer immediately after production or over a longer period of time.

FIG. 6 shows an illustration for a condition of such edge pressing. On the left side of the figure is shown a cross-section of a system for laminating a laminate 30. A membrane 210 is pressed onto the laminate 30 for lamination (e.g., by forming a suitable positive air pressure or negative air pressure). In membrane laminators, such a membrane 210 may have, for example, a thickness of up to 8 mm and an area on the order of up to several square meters. In the edge regions of the laminate 30, a surface of the membrane 210 overhangs the laminate 30, whereby a mechanical pressure exerted by the membrane 210 on the laminate 30 presses the laminate 30 there more than in a central region of the laminate 30. This results in edge compression of the laminate. The right side of the figure shows enlarged cross-sectional views of the pressed edge region of the laminate 30. Here, the laminate 30 comprises two glass layers 33 arranged around a layer 37 comprising a plastic and solar cells embedded therein. Glass layers can have thicknesses of up to 2.5 mm, for example, and the plastic layer can have a thickness in the range of a millimeter, for example, so that the laminate 30 can have a thickness of 5 mm when unpressed. Towards the edge of the laminate 30 (on the right side of the figure), the thickness of the laminate 30 is reduced due to overpressing. This causes sustained stress that limits the life and quality of the photovoltaic modules.

There is a need for a cost-effective and efficient suppression of edge compression in membrane laminators, which is also advantageously suitable for retrofitting membrane laminators already in operation so that existing automated processes can continue to be maintained.

SUMMARY OF THE INVENTION

The above problem is solved by a spacing device according to claim 1 and a method for manufacturing a spacing device according to claim 11. The dependent claims relate to advantageous further embodiments of the objects of the independent claims.

The present invention relates to a spacing device for a system for laminating a laminate, in particular photovoltaic modules. The system includes a membrane holder adapted to apply a membrane to the laminate while exerting a pressure, for laminating. The spacing device comprises a circumferential band and a plurality of spacing members connected to the band and adapted to at least partially frame the laminate in at least a portion of the band, thereby suppressing edge compression of the laminate during lamination.

In particular, the membrane can be held in a clamping frame which is lowered onto the laminate. The pressure on the laminate can be applied indirectly, i.e. not by direct contact. In particular, during lamination, a tarpaulin can lie between the membrane and the laminate for protection and for better release of the membrane from the laminate after lamination (a so-called "release_sheet"). The surface of the membrane overhangs a corresponding surface of the laminate, and the frame partially formed by the spacing members supports the membrane next to the laminate in a manner suitable for reducing an increased pressure in the edge region of the laminate resulting in particular from the tension of the membrane.

The frame formed by the spacing members may be only partial; in particular, it need not completely enclose the laminate. Supporting the membrane at certain suitable points may be sufficient to reduce edge loading. In addition—or alternatively—recesses of the frame may be conditioned by a geometry of the system. The frame can also be formed only in combination of spacing members distributed over several strips.

The spacer members are designed so that they can rotate with the belt. They can each be individually connected directly to the belt—for example glued, welded, sewn or screwed on. In embodiment examples, however, the belt also has drag bars for its circulating movement, and the spacing members can comprise an at least partially formed frame which is attached to one or more of the drag bars and circulates with the belt. For this purpose, the frame is advantageously designed to be flexible in the direction of rotation, but pressure-resistant and dimensionally stable vertically with respect to the belt. This can be achieved, for example, by introducing a suitable plastic material (such as rubber) or metal (such as chain bands), which forms all or only part of the frame.

Accordingly, the spacing members may comprise flexible material such as silicone or Teflon materials or ethylene-propylene-diene rubber such as EPDM or non-flexible material such as aluminum or steel. In particular, flexible materials can serve to circulate around the spacing members and can occur as continuous shapes, as bands, cords, and/or ropes, as segments with spaces between them, or in composition with non-flexible materials. Non-flexible materials can be used, for example, as chain bands, as zippers or also as rods, teeth or support elements for the spacing members.

Optionally, the laminating includes forming a negative pressure, and the spacing members are configured such that the formed frame has openings to promote an escape of gas from an area in or around the laminate during the laminating.

For example, membrane lamination systems exist in which the pressure of the membrane on the laminate is built up at least in part by creating a negative pressure in the area around the laminate. Alternatively or additionally, evacuation around the laminate during lamination promotes an escape of air from the laminate. In particular, this can also serve to prevent air or other gas inclusions in the laminate.

Optionally, fusion of plastic in the laminate occurs during lamination, and the spacer members are formed such that the formed frame has recesses or forms a gap to the laminate such that escaping plastic can be received or removed during lamination.

For example, a laminate for photovoltaic modules may include, among other things, a layer of a plastic material, such as ethylene vinyl acetate (EVA) or polyolefin (PO), sandwiched between two glass plates, which encloses a plurality of photovoltaic cells and associated contacts. During lamination, such plastic material may escape laterally from the laminate between the glass plates. The spacing members may be configured to allow and/or promote such escape of plastic material, for example, by a suitable shape of a frame formed from the spacing members. For example, the frame can have indentations, widenings, grooves, channels and/or other recesses on a side facing the laminate, which provide sufficient space for escaping molten plastic material or encapsulation material.

Optionally, the membrane holder is configured to apply the membrane to the laminate in a vertical motion, and the spacing members are configured such that when the membrane is applied to the laminate, the formed frame is flush with the laminate.

The flush finish is intended to prevent excessive deflection of the membrane, as is the case with conventional systems. This can be achieved, for example, by the spacing members having the same height as the laminate to be produced and/or being as close as possible to laminate at least on a side facing the membrane.

The height of the spacing members may also exceed the height of the laminate. In particular, this may be the case if there is a distance between the laminate and the spacing members when the membrane is pressed onto the laminate; for example, the spacing members may exceed the laminate by a few percent of the thickness of the laminate. A height of the spacing members may depend on the distance between the laminate and the spacing members.

Optionally, the spacing members have at least one of the following materials: steel, plastic, silicone, hard rubber, a base material with a non-stick coating.

Optionally, the spacing members are interchangeably connected to the perimeter belt to form frames that have sizes and/or heights adapted to different laminates.

For example, only holders could be attached to the circulating belt, into which elements suitable for specific laminates can be inserted in each case to form the spacing members. If the spacing members are connected to a tow bar of the belt, the connection to the tow bar can be detachable so that different spacing members for correspondingly different laminates can be connected to the tow bar.

Optionally, the circulating belt is a conveyor belt adapted to have the laminate placed thereon and transported at least partially through the system for lamination, or a release belt adapted to interpose between the membrane and the laminate during lamination and to promote release of the membrane from the laminate after lamination.

In particular, the conveyor belt or transport sheet can comprise a material such as Teflon, which is suitable for easily lifting the laminate from the conveyor belt after lamination and for preventing adhesion of material escaping from the laminate. In addition, the conveyor belt is advantageously sufficiently resistant to pressure and heat to be able to ensure its function as a release sheet for the laminate during lamination. The release tape or release sheet can also be designed to protect the laminate.

Optionally, the spacing device comprises, as a circulating belt, a release sheet on which spacing members are applied and, in addition, a further circulating belt having further spacing members, the further circulating belt being a conveyor belt adapted to transport the laminate for lamination. In addition, the further spacing members of the conveyor belt may be configured to engage at least some of the spacing members during lamination, thereby forming a stepless frame for the laminate, thereby suppressing edge compression of the laminate during lamination.

The term stepless is intended to mean in particular a uniform height of the frame. For example, it is possible to attach the spacer members to the transport sheet located below the laminates, but also to the release sheet located above the laminates. Similarly, part of the build-up height of the frame can be applied to the transport sheet and the other part of the build-up height to the release sheet, so that the target height of the frame is achieved when both build-up heights are superimposed in the process of laminating.

Optionally, the plurality of spacing members includes at least two spacing members configured to interlock in a zipper-like manner when forming the at least partial frame during lamination.

The interlocking spacing members may be on the same belt or on different belts.

Optionally, at least one of the spacing members may further include a chamfer to extend a service life or life of the diaphragm. Without bevels, sharp edges of the spacing members may cut into the membrane, damaging it. Alternatively or additionally, the shape is also suitable for exerting a force in the horizontal force direction toward the laminate, thereby reducing gaps between the spacer members and the laminate so as to minimize air entrapment (at least if the spacer members have some flexibility).

The present invention also relates to a method of manufacturing a spacing device for a system for laminating a laminate, in particular a photovoltaic module. In this regard, the system comprises a membrane holder adapted to apply a membrane for lamination to the laminate by exerting a mechanical pressure. The method comprises the following steps:

Providing a circumferential belt; and
attaching a plurality of spacing members to the perimeter tape such that the spacing members at least partially form a frame around the laminate during lamination, thereby suppressing edge compression of the laminate during lamination when the membrane is applied to the laminate.

The spacing device is thus intended in particular to prevent deflection of the edge of the laminate during lamination, by means of a mechanical support provided by the spacing members. The spacing members support the membrane directly and/or indirectly (for example, in the case of a release sheet running between the membrane and the spacing device) in an area of the membrane projecting beyond the laminate in such a way that additional pressure exerted in the edge area of the laminate by the tension of the membrane is at least reduced.

Advantages of embodiments of a spacing device as described above include in particular the possibility of low-cost production, which can merely be adapted to a geometry of an already existing system for membrane lamination and can also be retrofitted into such a system.

BRIEF DESCRIPTION OF THE DRAWINGS

The embodiments of the present invention will be better understood from the following detailed description and accompanying drawings, which, however, should not be construed as limiting the disclosure to the specific embodiments, but are merely for explanation and understanding.

DETAILED DESCRIPTION

Figure 1:
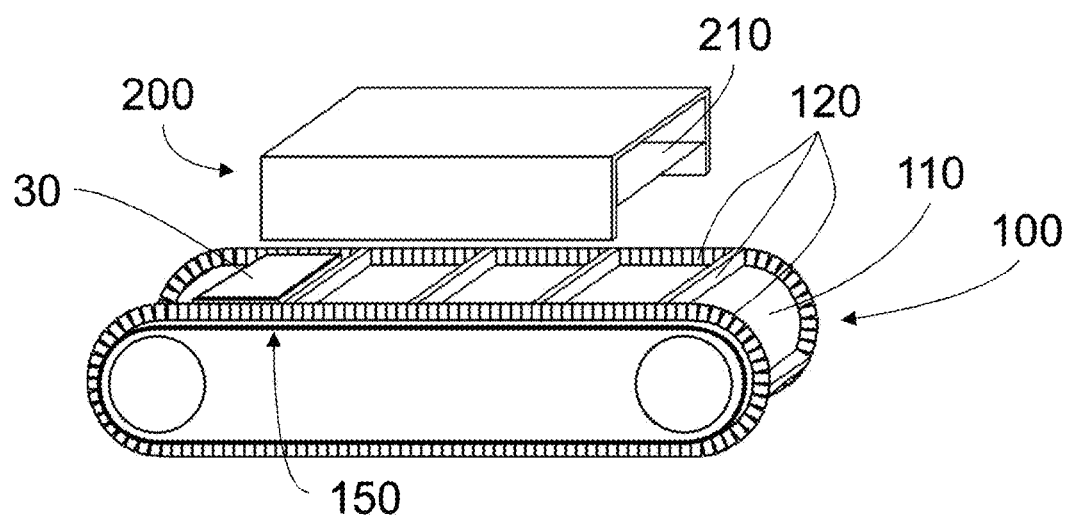
FIG. 1 shows a spacing device for a system for laminating a laminate.

FIG. 1 shows an embodiment of a spacing device 100 for a system for laminating a laminate 30, in particular photovoltaic modules. The system includes a membrane holder (holding device) 200 configured to apply a membrane 210 to the laminate 30 while exerting pressure for lamination. The spacing device 100 includes a circulating belt 110 guided by pulleys, and a plurality of spacing members 120 connected to the belt and configured to form a frame 150 for the laminate 30 in at least a portion of the circulating belt 110 and thereby suppress edge compression of the laminate 30 by the membrane 210 during lamination.

In order to avoid edge compression by the membrane 210, the active pressing area of the membrane 210 should not be larger than the laminate 30 to be manufactured. This is achieved here by the plurality of spacing members 120 forming frames 150 for the laminate 30. Advantageously, the frame 150 is only slightly larger than the outer edges of the laminate and is at least the height of the laminate 30 to be manufactured. Advantageously, the laminate 30 is placed in the lamination frame 150 before the process starts. By protecting the frame 150 from over-pressing of the edges by the membrane 210, laminates 30 can be manufactured without edge pressing. A distance of the spacing members 120 from the laminate 30 is also dependent on a placement accuracy of the laminate 30 on the belt 110. The placement accuracy varies between different systems for laminating. In examples, the spacing between the laminate 30 and the frame 150 may be on the order of 3 to 7 mm. Thus, the embodiment example allows for an automated process without manual handling and laminates 30 without edge or edge pressing.

In the figure shown, the circulating belt 110 in particular transports the laminate 30 through at least parts of the system for lamination. The laminates 30 are conveyed in on such a transport sheet and deposited prior to the start of the process. Embodiments in which a belt 110 other than the transport sheet is formed with spacing members 120 are conceivable. In particular, a plurality of belts 110 may exist whose respective spacing members 120 together form a frame 150 for the laminate 30 during lamination. For this purpose, the spacing members 120 may also interlock in the manner of a zipper.

In the illustrated figure, the spacing members 120 are fixed to the belt 110. The spacing members 120 may also be larger frame 150 forming structures that need only be connected to the belt 110 at specific locations. The spacing members 120 may be interchangeable, so that different spacing members 120 may be used to form frames 150 for different laminates 30.

Figure 2:
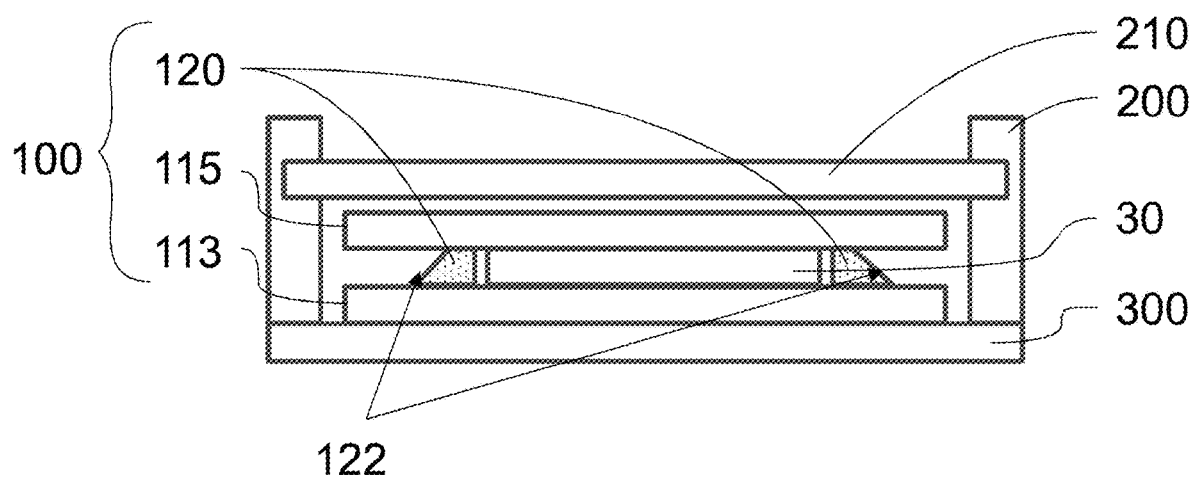
FIG. 2 shows twice a cross-section of another embodiment of a spacing device for a system for laminating a laminate.
Figure 2:
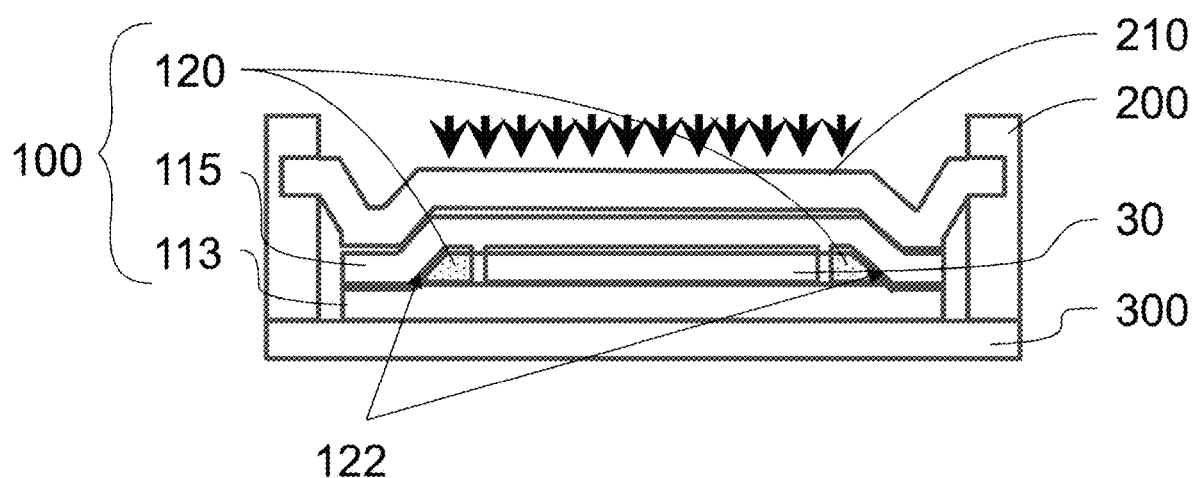

FIG. 2 shows, arranged one above the other, two cross-sections of a part of a system for lamination with a membrane holder 200 and a membrane 210 which is applied to a laminate 30 for lamination. The laminate 30 lies on a circumferential conveyor belt or transport sheet 113 over a hot plate 300. A release belt 115, also circumferential, extends between the membrane 210 and the laminate 30 to protect the laminate 30 from contamination, for example, and to facilitate lifting of the membrane 210 from the laminate 30 after lamination. In systems for laminating, a thickness of the release sheet 300 may be, for example, 0.3 mm. Spacer members 120 are shown adjacent to the laminate 30 to prevent the membrane 210 from pressing over the edges of the laminate 30. In the illustrated embodiment, the spacing members 120 are attached to the sheets 113, 115 in the laminator. Here, attachment to the transport sheet 113 located below the laminate 30 and/or to the release sheet 115 located above the laminate 30 is possible. The frame 150 formed by the spacing members 120 may include openings positioned perpendicular to the laminate 30 to facilitate evacuation of an area around the laminates 30. Bevels 122 on edges of the spacing members 120 increase the service life of the membrane 210.

In the cross-section shown above in the figure, the membrane 210 is lowered onto the laminate 30 or onto the release sheet 115. As a result, the membrane 210 closes a laminate chamber around the laminate 30. In the lower cross-section, a pressure is shown by the arrows above the membrane 210, which presses the membrane 210 onto the release sheet 115 and laminate 30. The pressure can be created or assisted, for example, by an overpressure of a fluid (e.g. air) above the membrane 210, but also by an evacuation of air from the laminate chamber. During lamination, heat is applied to the laminate 30 for lamination via a heating plate 300 shown below the transport sheet 113.

Figure 3:
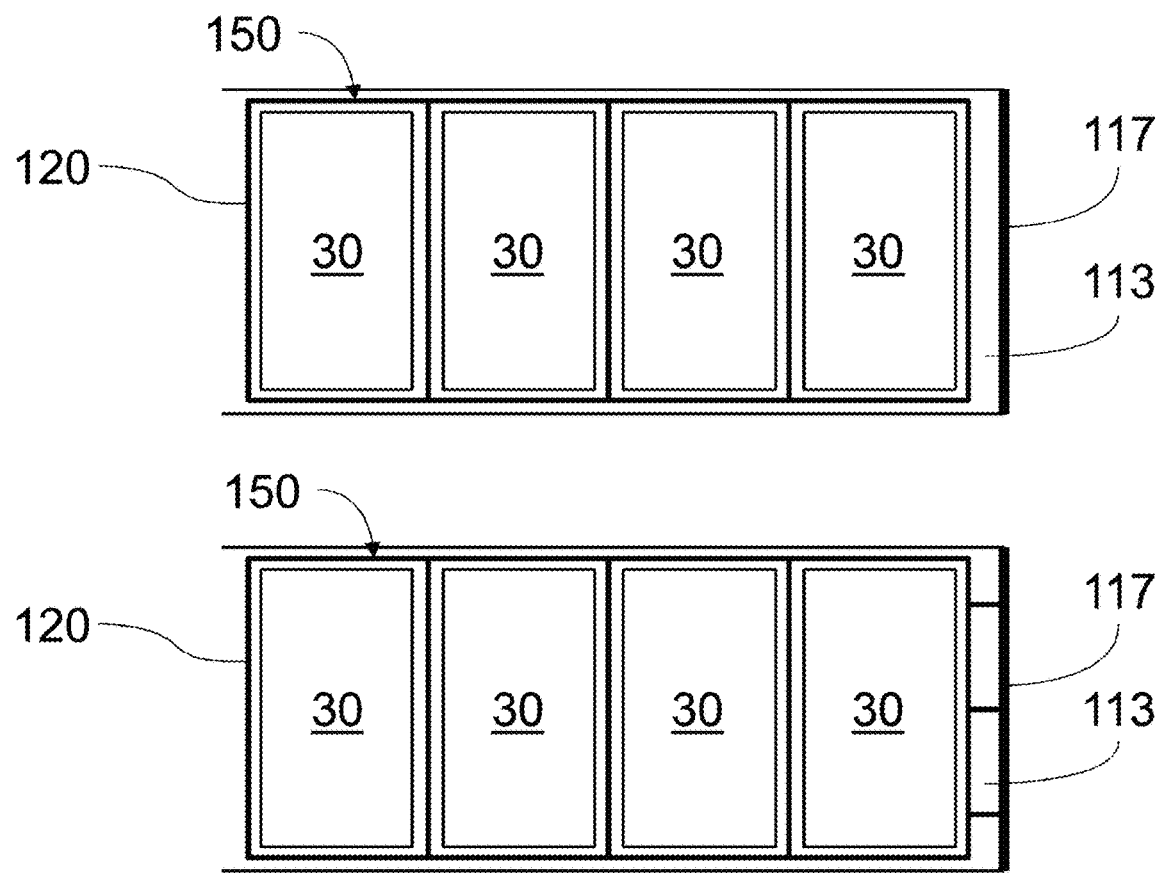
FIG. 3 shows views of two embodiments of the spacing device for a conveyor belt guided on drag bars.

FIG. 3 shows two views, one above the other, of each embodiment of the spacing device 100. In each of the two parts of the figure, a top view is shown of a portion of a circulating conveyor belt 113 that is pulled through the system for lamination via drag bars 117. In examples of membrane lamination systems, both a conveyor belt 113 and a release belt 115 (not shown here) are attached to and guided by such drag bars 117 through one or more laminate chambers or portions of the system for lamination. The conveyor belt 113 may be continuous or may be interrupted; in particular, a further section of the conveyor belt 113 may be adjacent to each right side of the drag bar 117, or the conveyor belt 113 may be interrupted there. On the conveyor belt 113, whose direction of rotation in each case points, for example, in the direction of the right edge of the image, a plurality of laminates 30 lie in frames 150 formed from spacer members 120.

In the upper portion of the figure, the spacing members 120 are attached directly to the conveyor belt 113. The frames 150 may also have spacing members 120 that extend in the direction of transport and are made of stretchable or flexible, but pressure-resistant material that allows the frames 150 to circulate.

In the lower part of the figure, the frames 150 for the individual laminates 30 are designed as a spacing members 120, which is not directly attached to the conveyor belt but, like the conveyor belt 113, is attached to and guided by the drag bar 117.

Figure 4:
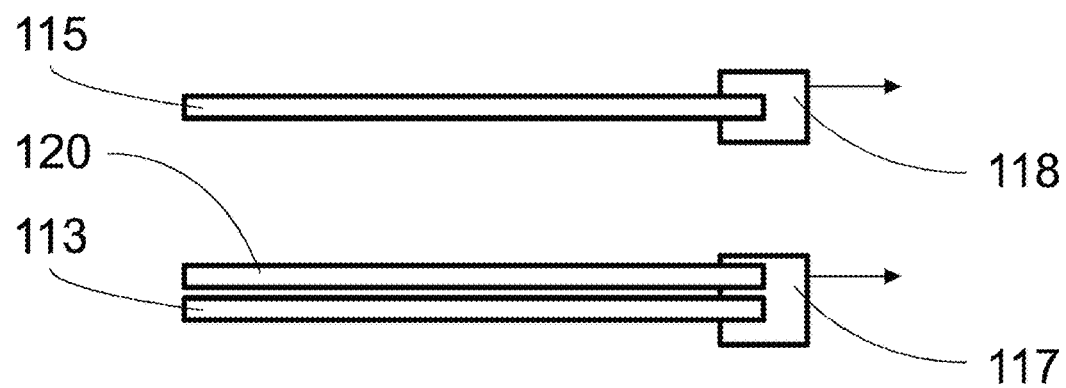
FIG. 4 shows a cross-section for a spacing device attached to tow bars.

FIG. 4 shows a cross-section for the embodiment example in the lower part of FIG. 3. A lower tow bar 117 and an upper tow bar 118 can be seen, for a circulating direction pointing to the right in the picture. A conveyor belt 113 is attached to the lower tow bar 117, and a release belt 115 is attached to the upper tow bar 118. Both tow bars 117, 118 pull the belts 113, 115 through the system for lamination. The belts 113, 115 can be continuous or interrupted; in particular, a further section of the respective belt 113, 115 can be adjacent to the right side of the tow rods 117, 118, or the respective belt 113, 115 can be interrupted there.

A spacing member 120 is also attached to the lower drag bar 117, which rests on the conveyor belt 113. The spacing member 120 may be, for example, bolted, welded or clamped to the drag bar 117. The spacing member 120 has frames 150 for one or more laminates 30 (not shown here). The spacing member 120 could alternatively be attached to and pulled by the tow bar 118.

Figure 5:
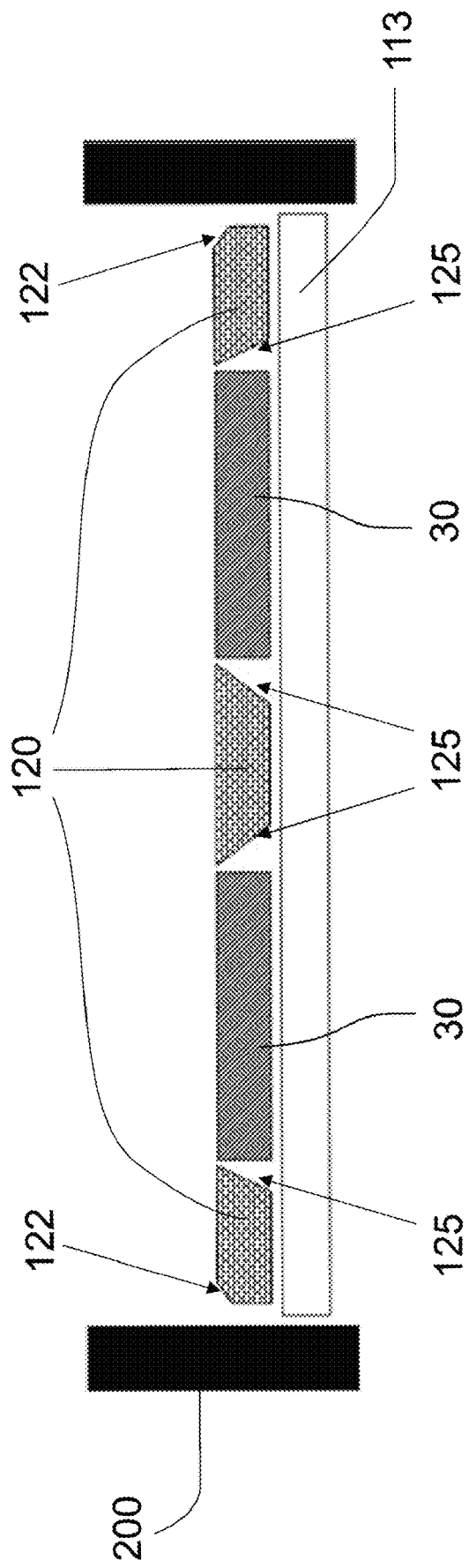
FIG. 5 shows further details of spacing members in a cross-section of a system for laminating with spacing device.
Figure 6:
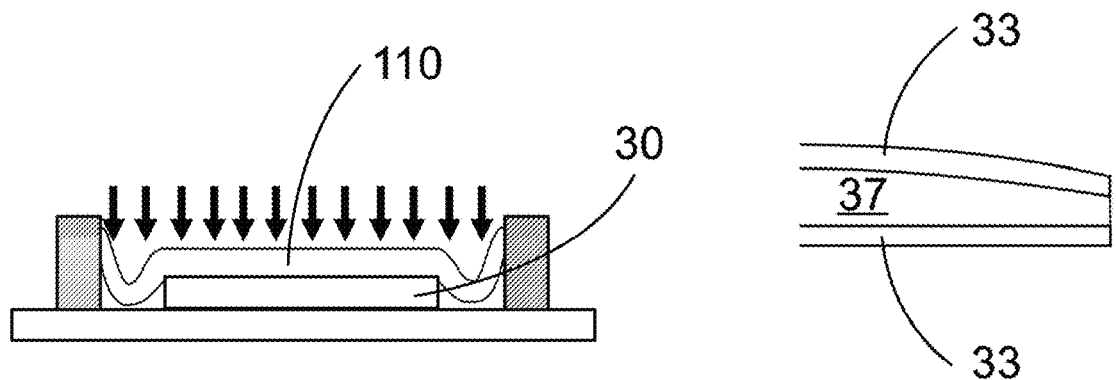
FIG. 6 shows an illustration of how edge pressing occurs in a conventional system for laminating without a spacing device.

FIG. 5 shows further details of spacing members 120 for an embodiment of the spacing device 100. Shown is a cross-section through a conveyor belt 113, a laminate 30 framed by spacing members 120, and a part of a membrane holder 200. The spacing members 120 are thereby connected to the conveyor belt 113. They have a shape that is intended to allow material to escape from the laminate 30 during lamination. In particular, for example, EVA from the plastic layer 37 (cf. FIG. 6) can escape from the laminate 30 during lamination. In the illustrated embodiment, the shape of the spacing members 120 is the bevels 125. The spacing members 120 reduce leakage of encapsulant material because the laminate edges are not over-pressed. The risk of sticking is thus already reduced or minimized. The spacing members 120 are given a slope towards the laminate edge by the bevels 125, so that outflowing encapsulation material has as little contact surface with the spacing members 120 as possible. Escaping material passes through this shape onto the conveyor belt 113. In this regard, it is advantageous if the spacing members 120, like the conveyor belt 113, have a non-stick coating of material that prevents escaping material from adhering (such as Teflon).

In addition, the outer spacing members 120 include bevels 122 that serve to protect the membrane 210 (not shown here), which is pressed on from above. Sharp edges may injure the membrane 210, the thickness of which may be in the range of less than one centimeter; the bevels 122 allow the membrane 210 to nestle over a larger area, thereby increasing a service life of the membrane 210.

Figure 7:
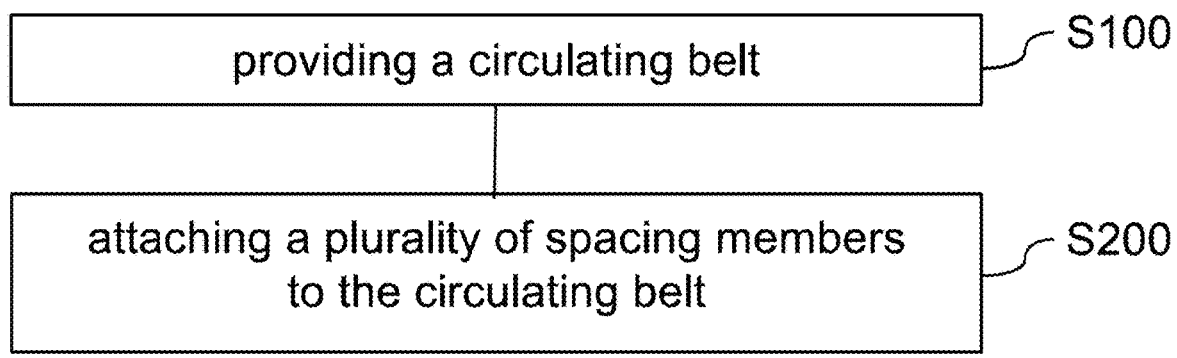
FIG. 7 shows steps of a method of making a spacing device for a system for laminating a laminate with a membrane.

FIG. 7 shows steps of a method for manufacturing a spacing device 100 for a system for laminating a laminate 30, in particular a photovoltaic module, the system comprising a membrane holder 200 adapted to apply a membrane 210 for lamination to the laminate 30 under application of a pressure. A first step comprises providing S100 a circulating belt 110, which may be part of an existing system. A further step comprises attaching S200 a plurality of spacer members 120 to the circulating belt 110, in a manner such that the spacer members 120 at least partially form a frame 150 around the laminate 30 during lamination, thereby suppressing edge compression of the laminate 30 during application of the membrane 210 to the laminate 30.

The features of the invention disclosed in the description, the claims and the figures may be essential to the realization of the invention either individually or in any combination.

LIST OF REFERENCE SIGNS 30 laminate
100 distance device
110 circulating belt
113 transport belt (transport sheet)
115 release band (release sheet)
117, 118 tow bars
120 spacing member(s)
122 beveling to increase a membrane service life
125 recess to accommodate escaping (exiting) material
150 frame
200 membrane holder (holding device)
210 membrane
300 heating plate

The invention claimed is:

1. A spacing device for a system for laminating a laminate of photovoltaic modules, the system comprising a membrane holder adapted to apply a membrane to the laminate under pressure for laminating, the spacing device comprising:
   a circulating belt;
   a plurality of spacing members connected to the belt and configured to at least partially form a frame for the laminate in at least a portion of the circulating belt and thereby suppress edge compression of the laminate during lamination; and
   at least one drag bar is detachably mounted to the spacing members and the at least partially formed frame is attached to at least one drag bar.

2. The spacing device according to claim 1, wherein said laminating comprises forming a negative pressure, and wherein:
   the spacing members are formed such that the formed frame has openings to promote escape of gas from an area in or around the laminate during lamination.

3. The spacing device according to claim 1, wherein fusion of plastic in the laminate occurs during lamination, and wherein the spacing members are formed such that the formed frame has recesses or forms a gap to the laminate to receive exiting plastic during lamination.

4. The spacing device according to claim 1, wherein the membrane holder is formed to apply the membrane to the laminate in a vertical movement, and wherein the spacing members are formed such that when the membrane is applied to the laminate, the formed frame is flush with the laminate.

5. The spacing device according to claim 1, wherein the spacing members comprise at least one of the following materials:
   steel,
   plastic,
   silicone,
   hard rubber, and
   a base material with a non-stick coating.

6. The spacing device according to claim 1, wherein the spacing members are interchangeably connected to the circulating belt to form frames having a size and/or height adapted to different laminates.

7. The spacing device according to claim 1, wherein the circulating belt is any one of the following:
- a conveyor belt adapted to have the laminate placed thereon and transported at least partially through the system for lamination,
- a release tape configured to interpose between the membrane and the laminate during lamination and to promote release of the membrane from the laminate after lamination.

8. The spacing device of claim 1, wherein the circulating belt is a release band configured to interpose between the membrane and the laminate during lamination and to promote release of the membrane from the laminate after lamination;

and wherein the spacing device further comprises:
- a further circulating belt having further spacing members, the further circulating belt being a conveyor belt-adapted to transport the laminate for lamination,
- and the further spacing members are formed to engage at least some of the spacing members during lamination to form a stepless frame for the laminate and thereby suppress edge compression of the laminate during lamination.

9. The spacing device according to claim 1, wherein the plurality of spacing members comprises at least two spacing members configured to interlock in a zipper-like manner when forming the at least partial frame during lamination.

10. The spacing device according to claim 1, wherein at least one of the spacing members comprises a bevel to extend a service life of the membrane and/or is adapted to build up a pressure towards the laminate when the membrane is applied to the laminate by the mechanical pressure exerted on the spacing member via the membrane.

11. A method of manufacturing a spacing device for a system for laminating a laminate of a photovoltaic module, the system comprising a membrane holder adapted to apply a membrane for lamination to the laminate under a mechanical pressure, the method comprising the steps of:
    providing a circulating belt; and
    attaching a plurality of spacing members to the circulating belt such that the spacing members at least partially form a frame around the laminate during lamination, thereby suppressing edge compression of the laminate during application of the membrane to the laminate; and
    detachably mounting at least one drag bar to the spacing members, wherein the at least partially formed frame is attached to at least one drag bar.

* * * * *